(12) United States Patent
Nishina

(10) Patent No.: US 6,411,382 B1
(45) Date of Patent: Jun. 25, 2002

(54) MONOCHROMATOR AND SPECTROMETRIC METHOD

(75) Inventor: Shigeki Nishina, Tokyo (JP)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 09/548,581

(22) Filed: Apr. 13, 2000

(30) Foreign Application Priority Data

Dec. 27, 1999 (JP) ............................................. 11-371828

(51) Int. Cl.[7] .................................................. G01J 3/18
(52) U.S. Cl. ........................ 356/333; 356/328; 356/300
(58) Field of Search ................................ 356/305, 326, 356/328, 331, 333, 334, 300

(56) References Cited

U.S. PATENT DOCUMENTS

| | | |
|---|---|---|
| 2,922,331 A | 1/1960 | Fastie et al. |
| 3,069,966 A | 12/1962 | White |
| 3,775,010 A | 11/1973 | Chupp et al. |
| 4,025,196 A | 5/1977 | Chupp et al. |
| 4,973,159 A | 11/1990 | Sohma et al. |
| 5,223,405 A | 6/1993 | Howell et al. |
| 5,233,405 A | 8/1993 | Wildnauer et al. |
| 5,532,818 A * | 7/1996 | Tokumoto .................... 356/333 |
| 6,166,805 A * | 12/2000 | Mori et al. .................. 356/334 |

FOREIGN PATENT DOCUMENTS

| | | |
|---|---|---|
| DE | 25 12 625 | 10/1975 |
| FR | 2754054 | 4/1998 |
| JP | 8-145795 | 7/1996 |

* cited by examiner

*Primary Examiner*—Frank G. Font
*Assistant Examiner*—Roy M. Punnoose
(74) *Attorney, Agent, or Firm*—Dellett and Walters (57) ABSTRACT

The monochromator and the spectrometric method are disclosed wherein the measured beam converted into a parallel beam by a first collimator is diffracted by a plane diffraction grating, then the diffracted beam is returned so that the diffracted beam after the return is separated from that before the return along rulings of the plane diffraction grating, the diffracted beam is diffracted again by the plane diffraction grating, then the beam condensed by a second collimator is allowed to pass through an exit slit.

9 Claims, 5 Drawing Sheets

Prior Art

FIG. 5

Prior Art

MONOCHROMATOR AND SPECTROMETRIC METHOD

BACKGROUND OF THE INVENTION

The present invention relates to a monochromator and a spectrometric method for projecting a measured beam (a beam which is measured) on one and the same diffraction grating a plurality of times.

Conventionally, a spectroscope called "monochromator," has been used as an instrument to measure wavelength characteristics of a measured beam. Particularly, a double monochromator is widely used to allow keeping a high resolution or a wide dynamic range by incidence of a beam into one or more diffraction gratings a plurality of times.

Figure 4:
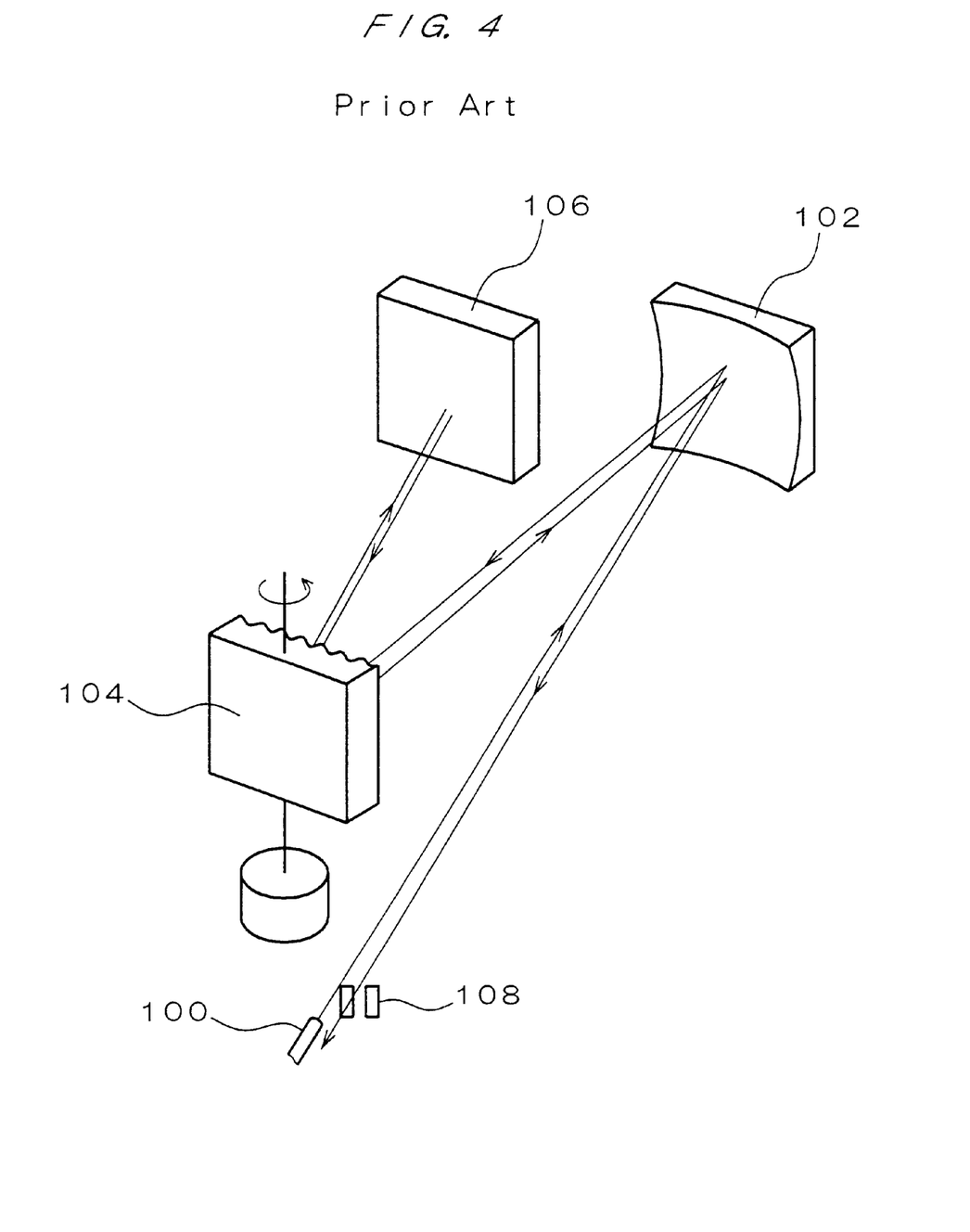
FIG. 4 is a perspective side view showing the outlined structure of a conventional monochromator.
Figure 5:
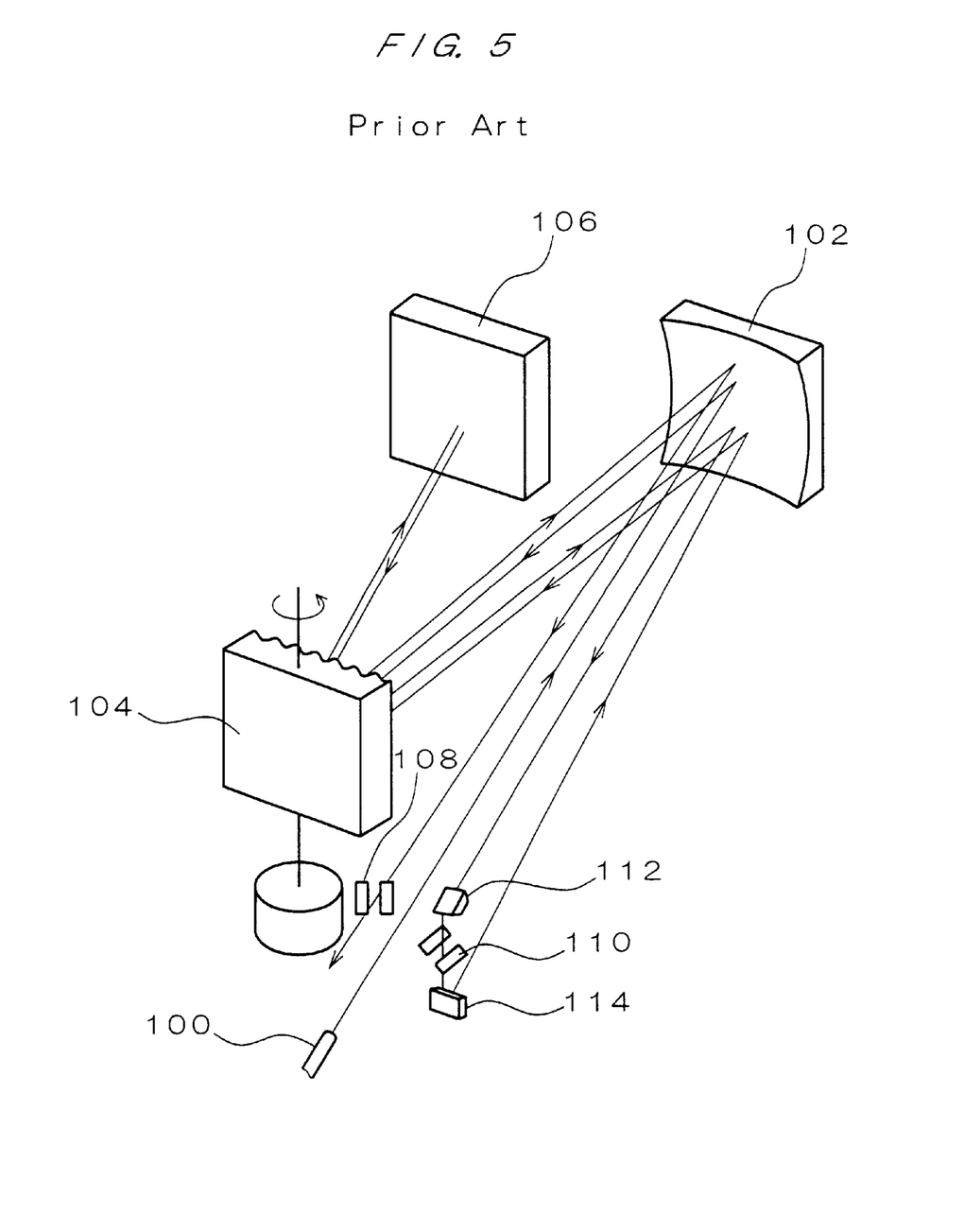
FIG. 5 is a perspective side view showing another outlined structure of the conventional monochromator.

For example, a variety of monochromators have been Japanese Patent Laid-Open No. 8-145795. FIGS. 4 and 5 are perspective side views showing the configuration of representative monochromators disclosed in the publication.

The monochromator shown in FIG. 4 converts a beam emitted from an optical fiber 100 to a parallel beam by a collimator 102 followed by diffracting this parallel beam by a plane diffraction grating 104. The diffracted beam is reflected by a plane mirror 106 having a reflecting surface perpendicular to the beam path, diffracted by the plane diffraction grating 104 followed by condensing by the collimator 102, and finally passes through a slit 108. A monochromator shown in FIG. 4 allows increasing the resolution of the wavelength λ of the diffracted beam passing through the exit slit 108, because the measured beam is diffracted twice in the identical plane diffraction grating 104.

In comparison with the structure shown in FIG. 4, the monochromator shown in FIG. 5 has a structure comprising an intermediate slit 110 and two mirrors 112 and 114. In the monochromator shown in the FIG. 5, the diffracted beam returned by reflection by the collimator 102 is reflected 90° by one mirror 112, passed through the intermediate slit 110 located in the condensing position of the diffracted beam, and reflected 90° by the other mirror 114 to return one more time through an optical system comprising the collimator 102, the plane diffraction grating 104, the plane mirror 106. Thus, the monochromator shown in FIG. 5 allows the dynamic range of the beam to widen by passing through the intermediate slit 110 and the exit slit 108.

As other conventional examples of the monochromator, those disclosed in U.S. Pat. Nos. 3,069,966 and 4,025,196 have been known.

Meanwhile, the conventional monochromator shown in FIG. 4 requires to locate both the optical fiber 100 used for incidence of the measured beam and the exit slit 108 in around the position of the focal point of the collimator 102 to make the structure around the focus position complex to disturb such work as assembling. Furthermore, the conventional monochromator shown in FIG. 5 requires to locate around the two mirrors 112 and 114 and the intermediate slit 110 in addition to the optical fiber 100 and the exit slit 108 around the position of the focal point of the collimator 102 to make the structure around the focus position more complex to disturb further such work as assembling.

SUMMARY OF THE INVENTION

The present invention created in consideration of such problems; the object is to provide a monochromator and a spectrometric method to allow such work as assembling by simplify the structure of the part where a measured beam is incoming and outgoing.

A monochromator of the present invention comprises a plane diffraction grating; a first collimator and a second collimator that are located in parallel to rulings of the plane diffraction grating; a first reflecting member that has at least two reflecting surfaces and returns a diffracted beam emitted from the plane diffraction grating so that an incident beam and an outgoing beam of the diffracted beam separate from each other along the rulings; and an exit slit located near a position of a focal point of the second collimator. By having the first reflecting member to separate and return an incident beam and an outgoing beam and the first and the second collimators for respective two separated rays, the exit slit may be located in the position of the focal point of the second collimator and other optical members may be located in the position of the focal point of the first collimator with a distance from each other. Therefore, the structures around respective positions of focus are simplified to improve such work as assembling.

More specifically, it is preferable that the incident member receiving the measured beam is located around the position of the focal point of the first collimator. Separating the incident member from exit slit with a distance simplifies respective fitting portions, increases a freedom of designing, and makes such work as mounting easy. Besides, improvement of resolution may become possible on the basis of that the identical plane diffraction grating carries out diffraction a plurality of times.

Alternatively, it is preferable that the exit slit and the incident member that receives the measured beam are located around the position of the focal point of the first collimator and that the intermediate slit and the second reflecting member, which is located in both outsides of the intermediate slit to reflect the emitted beam from the second collimator toward the second collimator, are located around the position of the focal point of the second collimator. Structures around the exit slit may be separated from the intermediate slit and the second reflecting member with a distance. Therefore, in comparison with that all these are located around the exit slit as conventional examples, respective parts maybe arranged more freely to allow freedom of designing and easy mounting work. Further, the dynamic range of the beam that passes through the exit slit may be widened by allowing to pass the measured beam through the intermediate slit in reflection of the measured beam by the second reflecting member.

Particularly, it is preferable that the direction of the intermediate slit in parallel to the rulings and that the two reflecting surfaces of the second reflecting member are located along the direction in which the beam emitted from the second collimator is swayed, when the plane diffraction grating is rotated about an axis which is parallel to the rulings of the grating. By such arrangement, an additive dispersion state may be realized to increase furthermore angular dispersion within the width of wavelength of the incident beam on the plane diffraction grating and also an increase in resolution becomes possible.

Alternatively, it is preferable that the intermediate slit is located in a direction that is perpendicular to the rulings and that the second reflecting member is located in a direction along the rulings. By such arrangement, a differential dispersion may be realized to reduce the angular dispersion within the width of wavelength of the incident beam on the plane diffraction grating. Under the condition of differential dispersion, the width of the exit slit need not change, even if the wavelength of the measured beam is changed, to make simplifying the structure possible.

The above described first reflecting member is preferable to emit the outgoing beam in a direction that is almost 180° opposite the direction of the incident beam. The exit slit may be easily disposed separately with a distance from other parts easily by locating the two collimators corresponding to these positions with the distance, because almost parallel reflected beam separated from the incident beam with the distance is returned.

Further, a spectrometric method of the present invention comprises the steps of: diffracting a measured beam converted into a parallel beam by a first collimator, by a plane diffraction grating; returning the diffracted beam so that the diffracted beam after the return is separated from and is almost parallel to that before the return along rulings of the plane diffraction grating; diffracting the diffracted beam again by the plane diffraction grating; condensing the diffracted beam by a second collimator; and allowing the diffracted beam to pass through an exit slit located in a position where the diffracted beam is condensed. The diffracted beam in the plane diffraction grating is returned to a separated position along the rulings and projected into the plane diffraction grating again in order to separate the focus positions of the two collimators, which have been installed to correspond to respective incident beam and outgoing beams, with a distance. Therefore, resolution may be improved and workability is also improved by simplifying the structure.

A spectrometric methods of the present invention comprises the steps of: diffracting a measured beam converted into a parallel beam by a first collimator, by a plane diffraction grating; returning the diffracted beam by a first reflecting member so that the diffracted beam after the return is separated from and is almost parallel to that before the return along rulings of the plane diffraction grating; diffracting the diffracted beam again by the plane diffraction grating; condensing the diffracted beam by a second collimator; returning the diffracted beam to almost the same beam path through an intermediate slit and a second reflecting member that are located in a position where the diffracted beam is condensed; and allowing the diffracted beam to pass through an exit slit located in the position where the diffracted beam is condensed by the first collimator. By such arrangement, the structure around the exit slit may be separated from the intermediate slit and the second reflecting member with a distance. Thus, respective parts may be arranged more freely to allow freedom of designing and easy mounting work. Further, the dynamic range of the beam that passes through the exit slit may be widen by allowing the measured beam to pass through the intermediate slit in reflection of the measured beam by the second reflecting member.

DESCRIPTION OF THE PREFERRED EMBODIMENT

Hereinafter, a monochromator of embodiments to which the present invention is applied will be described with the drawings that serve as a reference.

First Embodiment

Figure 1:
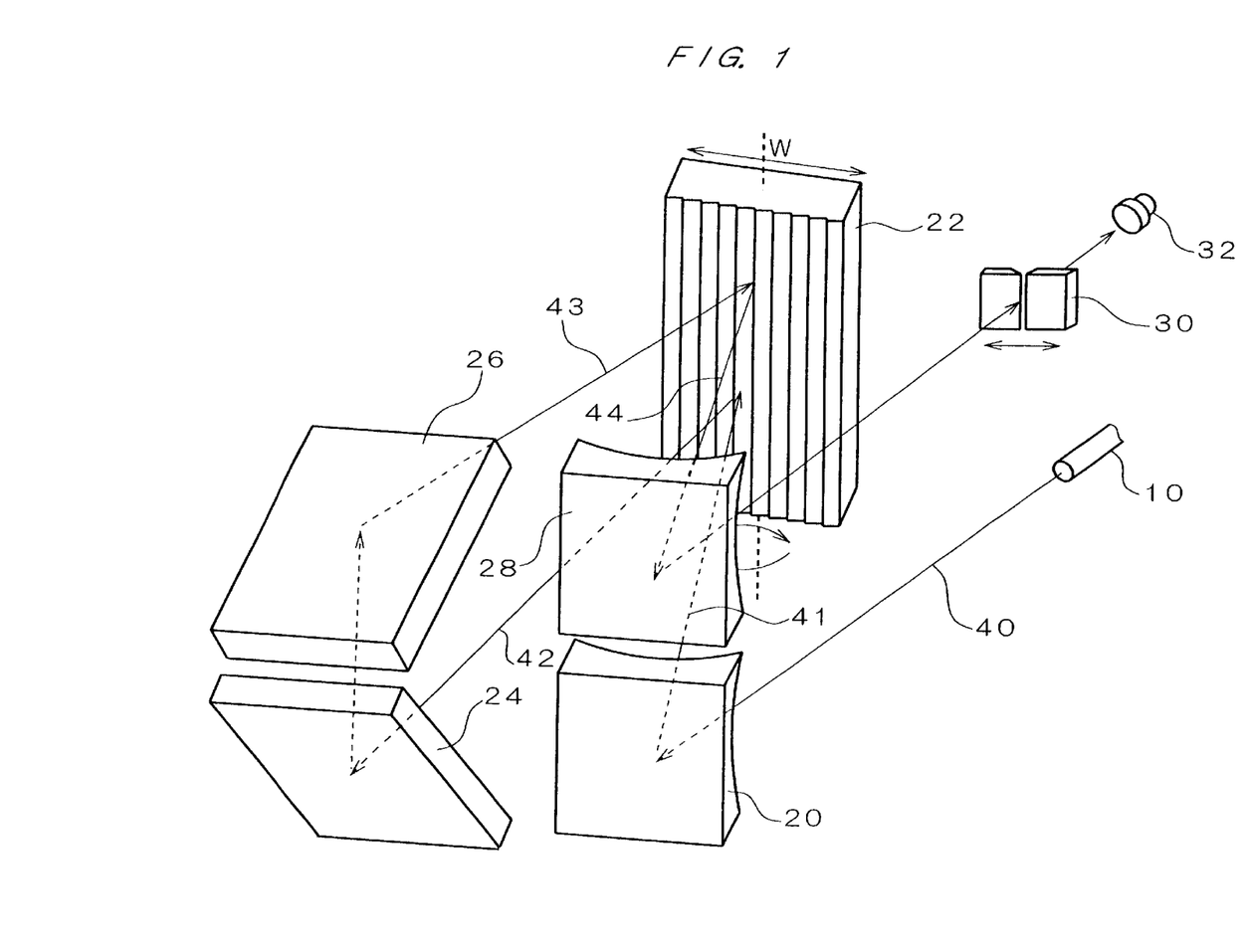
FIG. 1 is a perspective side view showing the outlined structure of a monochromator of a first embodiment.

FIG. 1 is a view showing the outlined structure of a monochromator of a first embodiment. As shown in FIG. 1, the monochromator of this embodiment comprises an incident fiber 10, two parabolic mirrors 20 and 28, a plane diffraction grating 22, two plane mirrors 24 and 26, an exit slit 30, and an photodetector 32.

The incident fiber 10 is used for emitting a measured beam toward one parabolic mirror 20 and of which position of an end for emission is set to correspond almost to the focus position of the parabolic mirror 20.

The two parabolic mirrors 20 and 28 are located with a given distance in parallel to the direction of rulings of the plane diffraction grating 22. The emission end of above described incident fiber 10 is located in the focus spot of one parabolic mirror 20. The measured beam emitted radially from the emitting end of the incident fiber 10 is reflected by the parabolic mirror 20 to convert to a parallel beam. Meanwhile, the exit slit 30 is located in the focus spot of the other parabolic mirror 28. The incident parallel beam on the parabolic mirror 28 is reflected and condensed by the exit slit 30. By passing through this exit slit 30, an unnecessary wavelength component is removed from the measured beam to project into the photodetector 32. The photodetector 32 measures the intensity of the incident beam through the exit slit 30.

The two plane mirrors 24 and 26 is located with a given distance in parallel to the direction of the rulings of the plane diffraction grating 22. One plane mirror 24 reflects almost 90° the beam diffracted by the plane diffraction grating 22 in parallel to the direction of the rulings of the plane diffraction grating 22. The other plane mirror 26 further reflects almost 90° the measured beam reflected by the one plane mirror 24. These two plane mirrors 24 and 26 return the measured beam emitted from the plane diffraction grating 22 toward the plane diffraction grating 22 again.

The plane diffraction grating 22 has rulings formed in a given direction with a certain intervals and diffracts the incident beam from the parabolic mirror 20 or the plane mirror 26. In FIG. 1, a plurality of grooves has been formed in parallel to a perpendicular direction. The width of the plane diffraction grating 22 along a direction that is normal to the direction of the rulings is assigned to W and the density of grooves is $\rho$ [/mm]. A mechanism for rotating such as a motor (not illustrated) having a rotation axis in parallel to the rulings is mounted on the plane diffraction grating 22. The rotating mechanism constitutes rotatably the plane diffraction grating 22 around the rotation axis as a center.

Above described incident fiber 10, the two parabolic mirrors 20 and 28, and the two plane mirrors 24 and 26 correspond to the incident member, the first and the second collimators, and the first reflecting member, respectively.

The monochromator of this embodiment has such structure. The action thereof is described below.

The incident beam 40 introduced from outside via the incident fiber 10 is reflected by one parabolic mirror 20, converted to a parallel beam 41, and projected on the plane diffraction grating 22. The plane diffraction grating 22 diffracts the parallel incident beam 41 from the one parabolic mirror 20 to emit as a diffracted beam 42. The diffracted beam 42 is projected on the one plane mirror 24 and reflected in a direction that is almost 180° opposite the direction in which it has been projected, by the two plane mirrors 24 and 26. Furthermore, using the two plane mirrors 24 and 26 allows move the path of the diffracted beam 42 projected on these two plane mirrors 24 and 26 and the path of the diffracted beam 43 emitted from these two plane mirrors 24 and 26 toward a given distance in a direction of the rulings of the plane diffraction grating 22.

The diffracted beam 43 reflected by the plane mirror 26 projected again into the plane diffraction grating 22. The plane diffraction grating 22 diffracts again the diffracted beam 43 projected to emit as a diffracted beam 44. The diffracted beam 44 is reflected by the other parabolic mirror 28 to form an image on the exit slit 30 located in the position of the focal point of this parabolic mirror 28.

Meanwhile, Rotating slightly the plane diffraction grating 22 around the axis of rotation as a center changes an incident angle of the parallel beam 41 projected on the plane diffraction grating 22 from the parabolic mirror 20 and a diffraction angle of the diffracted beam 42 emitted toward the plane mirror 24 from the plane diffraction grating 22. The same observation is yielded for the diffracted beam 43 projected on the plane diffraction grating 22 after reflection by the plane mirrors 26. By such rotation the plane diffraction grating 22 allows changing the wavelength $\lambda$ of the beam passing through the exit slit 30 because of change of the incident angle and the diffraction angle.

In this way, in the monochromator of this embodiment, the diffracted beam 42 emitted from the plane diffraction grating 22 is returned in a direction that is almost 180° opposite the direction in which it has been emitted and projected on the plane diffraction grating 22 by using the two plane mirrors 24 and 26, and then the measured beam emitted from the incident fiber 10 is diffracted twice by the same plane diffraction grating 22 before it reaches the exit slit 30. Therefore, it is possible to improve the resolution $(=\lambda/\Delta\lambda=2W\rho)$ of the wavelength of the diffracted beam passing through the exit slit 30.

Using the two plane mirrors 24 and 26 and the two parabolic mirrors 20 and 28 allows separating a path through which the measured beam projected from the incident fiber 10 reaches the one plane mirror 24 from a path through which the measured beam reflected by the other plane mirror 26 reaches the exit slit 30 with a distance along the rulings of the plane diffraction grating 22. Thus, respective positions of the incident fiber 10 and the exit slit 30 may be separated with a distance to make the structure of respective fitting parts noncomplex, the freedom of designing higher, and work for mounting them easy.

Second Embodiment

Figure 2:
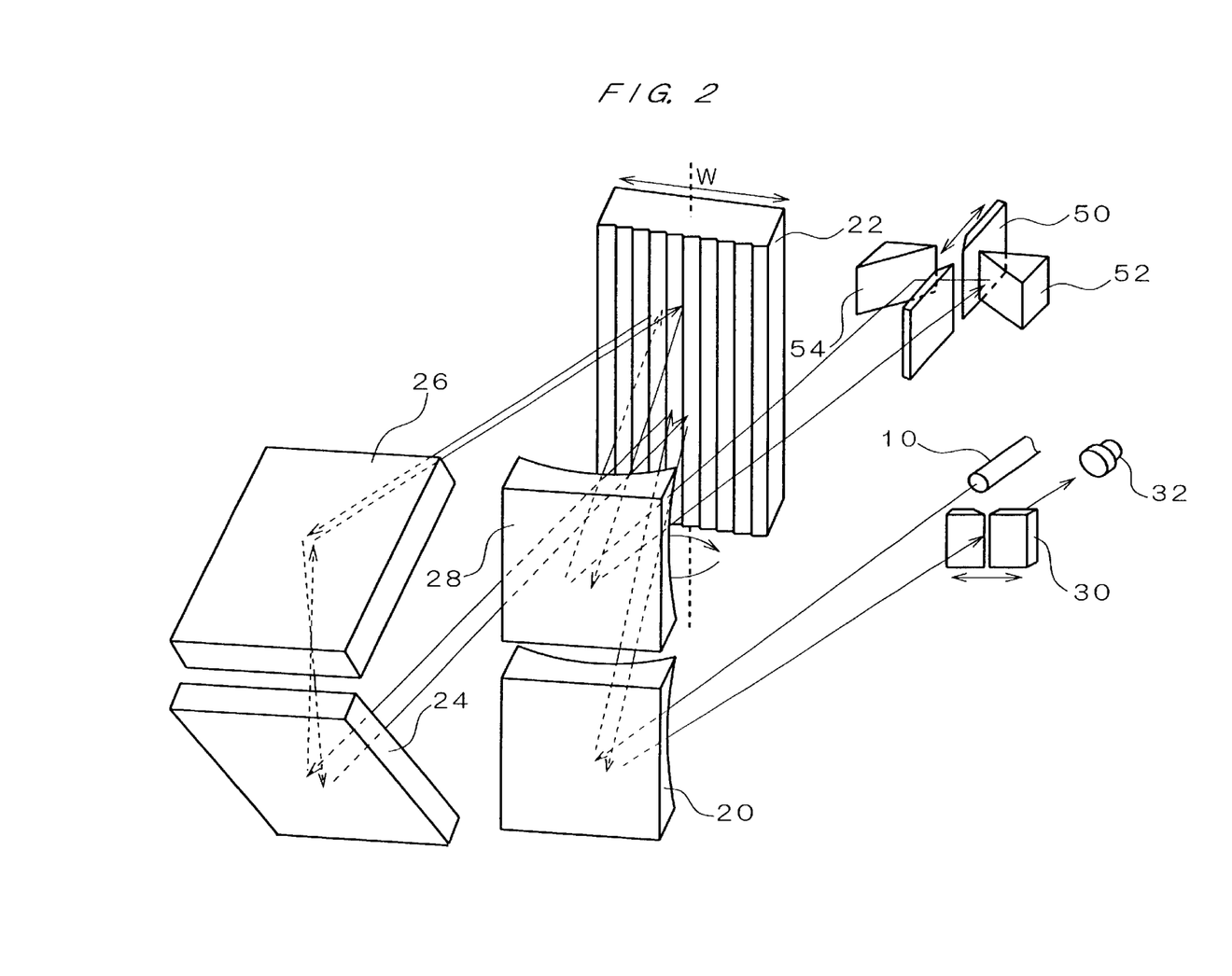
FIG. 2 is a perspective side view showing the outlined structure of a monochromator of a second embodiment.

FIG. 2 is a perspective side view showing the outlined structure of a monochromator of a second embodiment. As shown in FIG. 2, the monochromator of this embodiment comprises an incident fiber 10, two parabolic mirrors 20 and 28, the plane diffraction grating 22, two plane mirrors 24 and 26, the exit slit 30, photodetector 32, an intermediate slit 50, and two tilted mirrors 52 and 54.

The monochromator of this embodiment, as shown in FIG. 2, has differences in that the exit slit 30 and the photodetector 32 are located around the focus position of the one parabolic mirror 20 near the incident fiber 10 and that the intermediate slit 50 and the two tilted mirrors 52 and 54 are located around the focus position of the other parabolic mirror 28, in comparison with the monochromator of the first embodiment shown in the FIG. 1. Concerning basically the members same as those of the monochromator of the first embodiment shown in FIG. 1, the identical symbols and used to omit a detailed description.

The two tilted mirrors 52 and 54 are used for reflection of the beam condensed by the parabolic mirror 28 toward the parabolic mirror 28 again. These two tilted mirrors 52 and 54 correspond to the second reflecting member. These two tilted mirrors 52 and 54 are lied in along the direction to which the beam emitted from the parabolic mirror 28 sways, when the plane diffraction grating 22 is rotated around the rotating axis as a center parallel to the rulings. The measured beam emitted from the parabolic mirror 28 is approximately 90° reflected by the one tilted mirror 52, the beam that has passed through the intermediate slit 50 located in a position, in which the reflected beam is condensed, is approximately 90° reflected by the other tilted mirror 54, and finally returned toward the parabolic mirror 28 again.

The monochromator of this embodiment has such structure. Action thereof will be described below. In the same way as the monochromator shown in FIG. 1, after a measured beam introduced from outside through the incident fiber 10 is reflected or diffracted by respective the one parabolic mirrors 20, the plane diffraction grating 22, the one plane mirrors 24, the other plane mirrors 26, and the plane diffraction grating 22, it is condensed by the other parabolic mirrors 28. As described above, the measured beam condensed by this parabolic mirrors 28 is reflected by the one tilted mirrors 52 to change 90° the course thereof, passed through the intermediate slit 50 located in the condensing position to reflect by the other tilted mirrors 54, changed the course thereof approximately 90° to return toward the other parabolic mirrors 28 side. The measured beam projected on the parabolic mirrors 28 again by such steps goes back through the identical path so far traveled and passes through the exit slit 30 located around the focus position of the parabolic mirror 20 to reach the photodetector 32.

In this way, in the monochromator of this embodiment, the diffracted beam emitted from the plane diffraction grating 22 is returned in a direction that is almost 180° opposite the direction in which it has been emitted and projected on the plane diffraction grating 22 by using the two plane mirrors 24 and 26, and then the measured beam projected from the incident fiber 10 is diffracted twice by one and the same plane diffraction grating 22 before it reaches to the other parabolic mirrors 28. Further, after these steps, the measured beam passes through the intermediate slit 50 located around the focus position of this parabolic mirror 28 to go back through the identical beam path and diffracted twice by one plane diffraction grating 22. Thus, Passing through the intermediate slit 50 in addition to the exit slit 30 allows removal of an unnecessary wavelength component from the measured beam to widen the dynamic range of the beam. Besides, locating the two tilted mirrors 52 and 54 along a direction to which the measured beam sways by rotation of the plane diffraction grating 22 allows realization of the additive dispersion alignment. Therefore, it is possible to improve further the resolution $(=\lambda/\Delta\lambda=4W\rho)$ of the wavelength of the diffracted beam passing through the exit slit 30.

Using the two plane mirrors 24 and 26 and the two parabolic mirrors 20 and 28 allows separating a path of the measured beam traveling between the incident fiber 10 or the exit slit 30 and the one plane mirror 24 and a path of the measured beam traveling between the intermediate slit 50 and the other plane mirror 26, with a distance along the rulings of the plane diffraction grating 22. Thus, respective positions of the incident fiber 10 and the exit slit 30, the two tilted mirrors 52 and 54, and the intermediate slit 50 may be separated with a distance to make the structure of respective fitting parts noncomplex, the freedom of designing higher, and work for mounting them easy.

Separate positioning of the exit slit 30 and the intermediate slit 50 each other allows prevention of the phenomena so-called cross talk or stray phenomenon in which a part of the measured beam heading to the intermediate slit 50 from the parabolic mirror 28 travels into the exit slit 30. Also, it improves the dynamic range.

Third Embodiment

Figure 3:
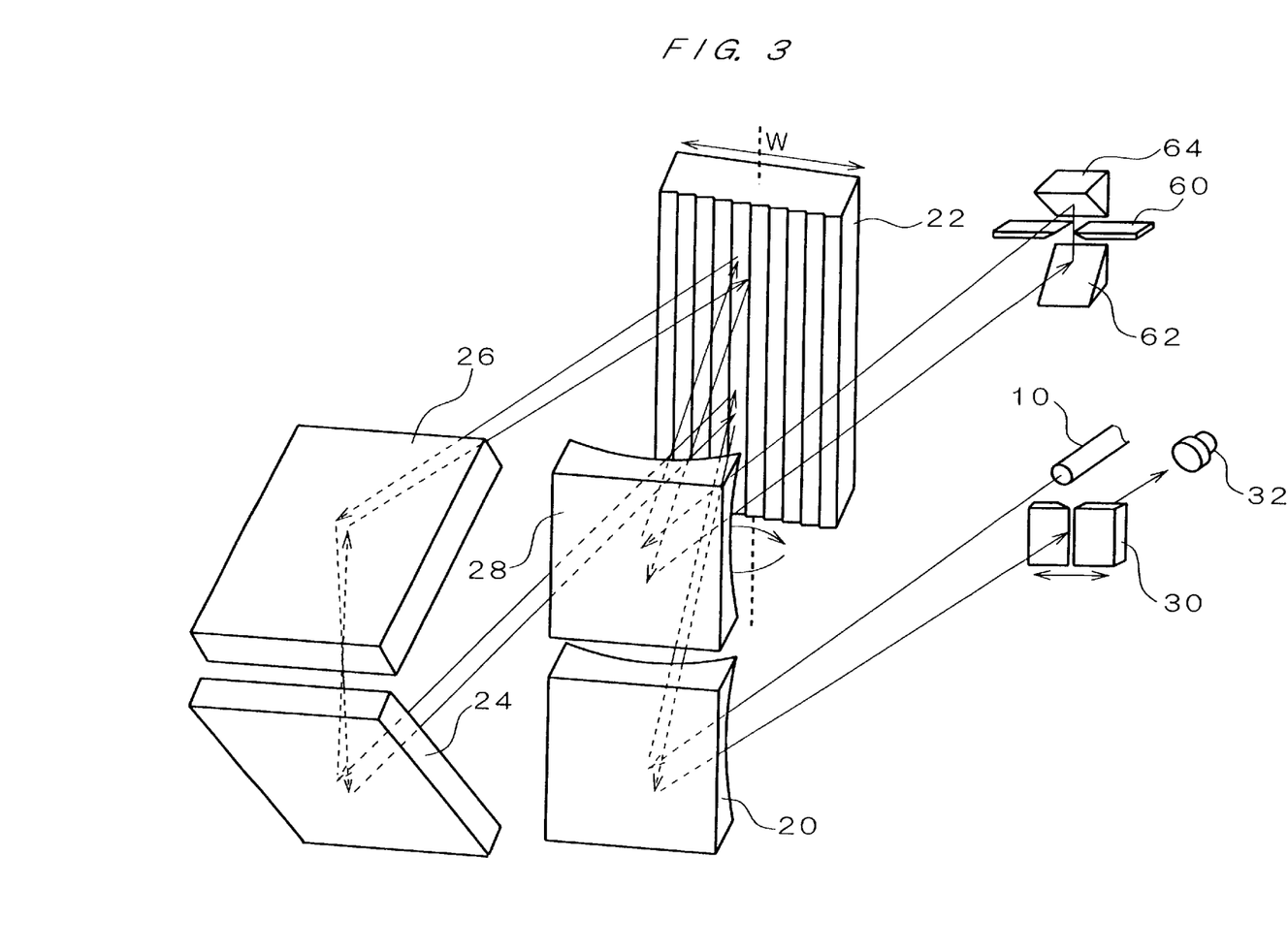
FIG. 3 is a perspective side view showing the outlined structure of a monochromator of a third embodiment.

FIG. 3 is a perspective side view showing the outlined structure of a monochromator of a third embodiment. As shown in FIG. 3, the monochromator of this embodiment comprises an incident fiber 10, two parabolic mirrors 20 and 28, the plane diffraction grating 22, the two plane mirrors 24 and 26, the exit slit 30, the photodetector 32, an intermediate slit 60, and two tilted mirrors 62 and 64.

The monochromator of this embodiment, as shown in FIG. 3, has differences in that the intermediate slit 50 and the two tilted mirrors 52 and 54 are replaced by the intermediate slit 60 and the two tilted mirrors 62 and 64 of different arrangement from the former combination, in comparison with the monochromator of the second embodiment, for carrying out the invention, shown in FIG. 2. Concerning basically the members same as those of the monochromator shown in FIG. 1 and FIG. 2, the identical symbols are used to omit a detailed description.

The two tilted mirrors 62 and 64 are used for reflection of a beam condensed by the parabolic mirror 28 toward the parabolic mirror 28 again. These two tilted mirrors 62 and 64 correspond to the second reflecting member. These two tilted mirrors 62 and 64 are located side by side in a direction parallel to the rulings of the plane diffraction grating 22. The measured beam emanated from the parabolic mirror 28 is approximately 90° reflected by the one tilted mirror 62, the measured beam that has passed through the intermediate slit 60 located in a position, in which the reflected beam is condensed, is approximately 90° reflected by the other tilted mirror 64, and finally returned toward the parabolic mirror 28 again.

The monochromator of the third embodiment has such structure. Action thereof will be described below. In the same way as the monochromator shown in FIG. 1, after a measured beam introduced from outside through the incident fiber 10 reflected or diffracted by respective the one parabolic mirrors 20, the plane diffraction grating 22, the one plane mirrors 24, the other plane mirrors 26, and the plane diffraction grating 22, it is condensed by the other parabolic mirrors 28. As described above, the measured beam condensed by this parabolic mirrors 28 is reflected by the one tilted mirrors 62 and shifted 90° from the direction of travel so as to be along the rulings of the plane diffraction grating 22, passed through the intermediate slit 60 located in the condensing position to reflect by the other tilted mirrors 64, changed the traveling direction thereof approximately 90° to return toward the other parabolic mirrors 28 side. The measured beam projected on the parabolic mirrors 28 again by such steps reverses the identical path so far traveled and passes through the exit slit 30 located around the focus position of the parabolic mirror 20 to reach the photodetector 32.

As described above, in the monochromator of the third embodiment, passing through the intermediate slit 60 in addition to the exit slit 30 allows removal of an unnecessary wavelength component from the measured beam to widen the dynamic range of the beam. Meanwhile, the resolution ($=\lambda/\Delta\lambda=2W\rho$) of the wavelength $\lambda$ of the diffracted beam passing through the exit slit 30 is the same as that of the monochromator of the first embodiment. However, locating the two tilted mirrors 62 and 64 in a direction parallel to the rulings of the plane diffraction grating 22 allows realization of differential dispersion alignment. The wavelength of the measured beam may be changed by rotating the plane diffraction grating 22 and by changing a slit width of the exit slit 30. Changing a slit width of the intermediate slit 60 is unnecessary. Therefore, A wide dynamic range same as that of the monochromator, of the second embodiment, having the additive dispersion alignment can be realized with a relatively simple structure.

It is the same as that of the monochromator of the second embodiment that use of the two plane mirrors 24 and 26 and the two parabolic mirrors 20 and 28 allows separating a path of the measured beam traveling between the incident fiber 10 or the exit slit 30 and the one plane mirror 24 from a path of the measured beam traveling between the intermediate slit 60 and the other plane mirror 26, with a distance along the rulings of the plane diffraction grating 22. Thus, respective positions of the incident fiber 10 and the exit slit 30, the two tilted mirrors 62 and 64, and the intermediate slit 60 may be separated with a distance to make the structure of respective fitting parts noncomplex, the freedom of designing higher, and work for mounting them easy.

The present embodiment is to be considered in all respects as illustrative and not respective. Therefore, the scope of the invention being indicated by the appended claims rather than by the foregoing description and all changes which come within the meaning and range of equivalency of the claims are therefore intended to be embraced therein. For example, the two parabolic mirrors 20 and 28 were used as collimators in aforementioned mode for carrying out the present invention. However, condenser lenses may be used for this purpose. The traveling direction of incident beam is approximately 180° returned by using the two plane mirrors 24 and 26 and their beam paths were separated along the rulings of the plane diffraction grating 22 with a distance. However, three or more plane mirrors may be combined. Or, the incident beam may be reflected by using two reflecting surfaces that have been orthogonalized each other in the same member.

The monochromator may be prepared by combining the incident fiber 10, the exit slit 30, and the intermediate slit 50 and 60 of each mode for carrying out the present invention. For example, in the monochromator of the additional dispersion alignment shown in FIG. 2, the exit slit 30 may be replaced by the intermediate slit 60 and the tilted mirrors 62 and 64 shown in FIG. 3 and also the exit slit 30 and the photodetector 32 maybe moved around the intermediate slit 60. In this case, a monochromator in combination of the additional dispersion alignment and a differential dispersion alignment can be realized. In any combinations, the incident fiber 10, the exit slit 30, and the intermediate slit 50 and 60, which were intensively located in a single place so far, can be separately located in two places to make freedom of allocation of respective parts large, the structure simply, and improvement of such work as assembling possible.

What is claimed is:

1. A monochromator, comprising:
 a plane diffraction grating;
 a first collimator and a second collimator that are located substantially aligned with one another along an axis in parallel to rulings of said plane diffraction grating;
 a first reflecting member that has at least two reflecting surfaces and returns a diffracted beam emitted from said plane diffraction grating so that an incident beam and an outgoing beam separate from each other along said rulings; and an exit slit located near a position of a focal point of said second collimator.

2. The monochromator according to claim 1, wherein an incident member that receives a measured beam is located near a position of a focal point of said first collimator.

3. The monochromator according to claim 1, wherein said first reflecting member emits the outgoing beam in a direction that is almost 180° opposite the direction of the incident beam.

4. A monochromator, comprising:

a plane diffraction grating;

a first collimator and a second collimator that are located substantially aligned with one another along an axis in parallel to rulings on said plane diffraction grating;

a first reflecting member that has at least two reflecting surfaces and returns a diffracted beam emitted from said plane diffraction grating so that an incident beam and an outgoing beam separate from each other along said rulings;

the exit slit located near a position of a focal point of said first collimator;

an incident member that receives a measured beam and is located near a position of a focal point of said first collimator;

an intermediate slit located near a position of a focal point of said second collimator; and a second reflecting member that is located on both sides of said intermediate slit near the position of the focal point of said second collimator and reflects an outgoing beam from said second collimator to said second collimator.

5. The monochromator according to claim 4, wherein:

the direction of said intermediate slit is located in parallel to said rulings: and said second reflecting member is located along a direction where the beam that is emitted from said second collimator sways, when said plane diffraction grating is rotated around said rulings as a rotation center.

6. The monochromator according to claim 4, wherein said intermediate slit is located in a direction that is normal to said rulings, and said second reflecting member is located in a direction along said rulings.

7. The monochromator according to claim 4, wherein said first reflecting member emits the outgoing beam in a direction that is almost 180° opposite the direction of the incident beam.

8. A spectrometric method, comprising the steps of:

diffracting a measured beam converted into a parallel beam by a first collimator, by a plane diffraction grating;

returning the diffracted beam so that the diffracted beam after the return is separated from and is almost parallel to that before the return along rulings of said plane diffraction grating;

diffracting the diffracted beam again by said plane diffraction grating;

condensing the diffracted beam by a second collimator, wherein said second collimator is substantially aligned with said first collimator along an axis parallel to rulings on said plane diffraction grating; and allowing the diffracted beam to pass through an exit slit located in a position where the diffracted beam is condensed.

9. A spectrometric method, comprising the steps of:

diffracting a measured beam converted into a parallel beam by a first collimator, by a plane diffraction grating;

returning the diffracted beam by a first reflecting member so that the diffracted beam after the return is separated from and is almost parallel to that before the return along rulings of said plane diffraction grating;

diffracting the diffracted beam again by said plane diffraction grating;

condensing the diffracted beam by a second collimator;

returning the diffracted beam to almost the same beam path through an intermediate slit and a second reflecting member that are located in a position where the diffracted beam is condensed; and allowing the diffracted beam to pass through an exit slit located in the position where the diffracted beam is condensed by said first collimator.

* * * * *